Sept. 15, 1953 N. E. HART 2,652,020
WEIGHING SCALE LENS FRAME MOUNTING
Filed Sept. 5, 1951 3 Sheets-Sheet 1
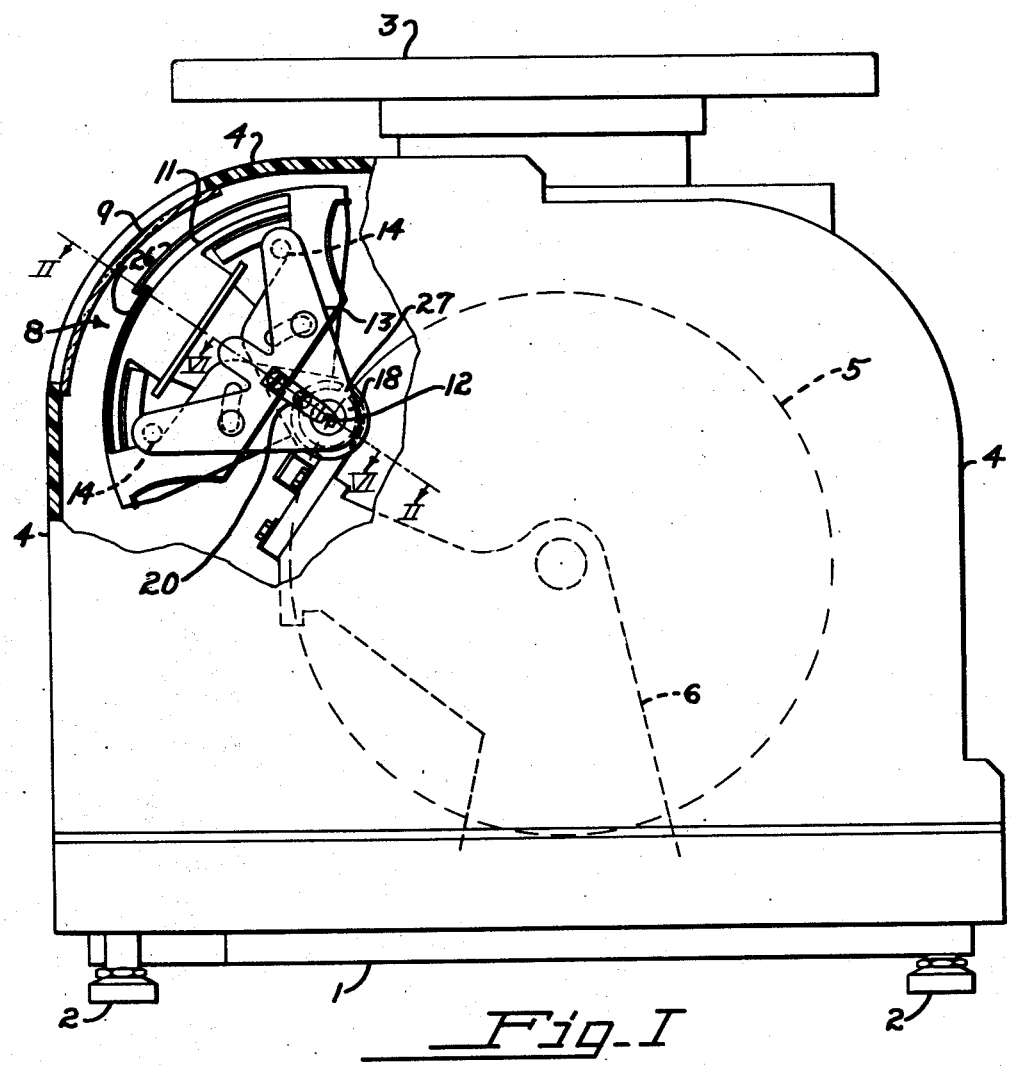
Fig. I
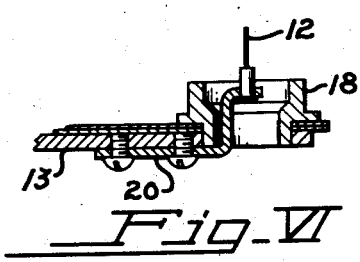
Fig. VI
Inventor
NORMAN E. HART
By Marshall & Marshall
Attorneys

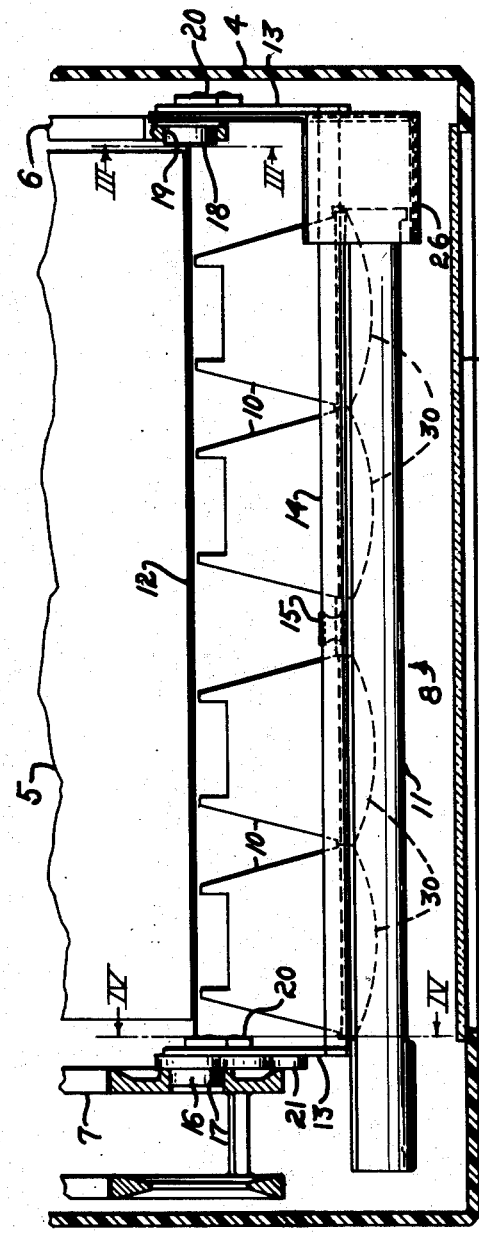

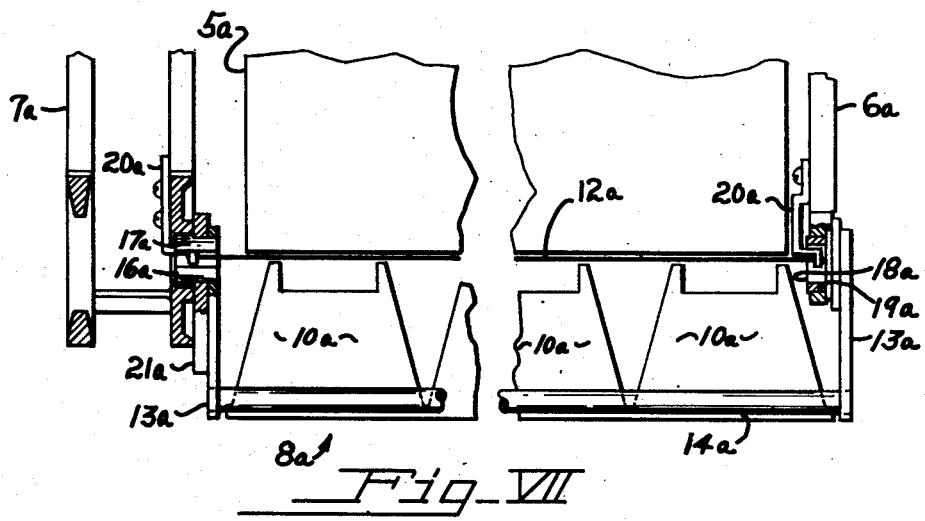
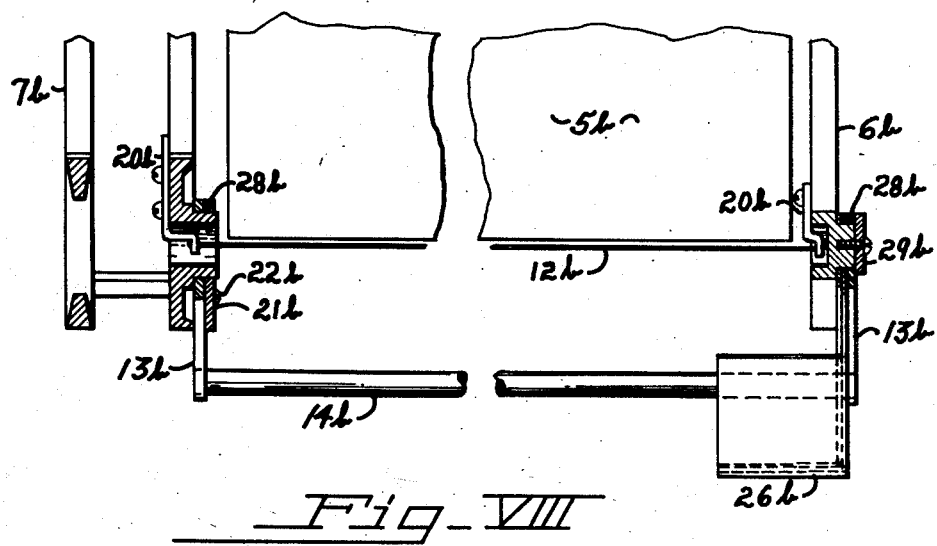

Patented Sept. 15, 1953

2,652,020

UNITED STATES PATENT OFFICE 2,652,020

WEIGHING SCALE LENS FRAME MOUNTING

Norman E. Hart, Toledo, Ohio, assignor to Toledo Scale Company, Toledo, Ohio, a corporation of New Jersey Application September 5, 1951, Serial No. 245,113

7 Claims. (Cl. 116—129)

This invention relates to weighing scales and particularly to means for mounting indicia viewing devices in weighing scales.

The principal object of this invention is to provide an indicia viewing device in the form of subassembly which can be installed in or removed from a scale as a unit without affecting any adjustments. Ancillary thereto is a decrease in the cost of repairs resulting from a decrease in time required for servicing.

Another object is the provision of an indicia reading line incorporated with the indicia viewing device or with chart supporting means in a manner to facilitate assembly of the viewing device and accurate positioning of the reading line in relation to the chart.

A further object is to provide improved means in a weighing scale for easy, rapid, and inexpensive installation or removal of an indicia viewing device.

According to the invention, a tiltable viewing device frame is constructed with end plates rigidly supported in spaced-apart relation by connecting rods. Located on the end plates are sleeve-like hollow trunnions which are adapted to be slidably inserted into coaxial holes in chart support members juxtaposed to the end plates. The trunnions extend in the same direction from the end plates so that merely a slight axial movement is required to engage or disengage the viewing device and permit its installation or removal as a unit. One of the chart support members is slotted longitudinally to provide for passage of the reading line therethrough during mounting or dismounting of the viewing device.

The indicia viewing device is free to move in a limited arcuate path about the axis of the hollow trunnions when said trunnions are engaged within the support member holes.

Further objects and advantages will be apparent from the following description in which reference is had to the accompanying drawings.

In the drawings:

Figure I is an end elevational view with parts being broken away and other parts shown in section, of a preferred embodiment of the invention.

Figure II is a fragmentary sectional view taken along the line II—II of Figure I.

Figure III is an enlarged fragmentary elevation taken along the line III—III of Figure II.

Figure IV is an enlarged fragmentary elevation taken along the line IV—IV of Figure II.

Figure V is an enlarged fragmentary sectional elevation taken along the line V—V of Figure IV.

Figure VI is an enlarged detailed sectional view taken substantially along the lines VI—VI of Figure I.

Figure VII is a view similar to Figure II, with parts broken away, showing a modification of the mounting means.

Figure VIII shows a further modification of the mounting means.

These specific figures and the accompanying description are intended to merely illustrate the invention but not to impose limitations on the claims.

Referring to the drawings in detail, a scale embodying the invention includes a base 1 supported by a plurality of jack-screw type adjustable feet 2. A lever system (not shown) supports a load receiving platform 3 and is operatively connected to a load counterbalancing mechanism (not shown) mounted within a casing 4. An indicia bearing cylindrical chart 5 is operatively connected to the load counterbalancing mechanism to rotate through an angle proportional to the load applied to the load receiving platform 3.

Located within the casing 4 and secured to the base 1 are a pair of upright chart supports 6 and 7 which support the indicia bearing chart 5 and an indicia viewing device 8. The viewing device 8 is positioned directly behind a window 9 fastened to the casing 4. An optical magnification system contained within the indicia viewing device consists of a series of lenses 30 contained within a plurality of lens cells 10. The lenses and lens cells are supported by a lens frame 11. An indicia reading line 12 is positioned closely adjacent the surface of the chart 5 and in the field of view through the lenses 30 of the indicia viewing device 8.

The lens frame 11 is mounted upon a frame assembly consisting of a pair of V-shaped end plates 13 rigidly connected by upper and lower connecting rods 14 serving as track rails. The lens frame 11 is free to move to the right or left along the lens track on a plurality of rollers 15 engaging the rods 14. The end plates 13 are designed to pivot in a short arcuate path about an axis coextensive with the reading line 12. The indicia viewing device can therefore be tilted up or down to permit the optical axis of the lens to be aligned with the user's line of sight.

The indicia viewing device is supported on the chart supports 6 and 7 by the engagement of a leftwardly projecting trunnion 16 fixed in the left end plate 13 and engaged in a hole 17 in the left chart support 7, and by a similar leftwardly projecting trunnion 18 fixed in the right end plate 13 and engaged in a hole 19 in the right chart support 6. The trunnions 16 and 18 are hollow to receive interiorly the offset portions of reading line brackets 20.

A lock plate 21 lies intermediate the left end plate 13 and the chart support 7, and is fastened to said chart support by means of a screw 22. The lock plate is formed with a hole at one end to receive the trunnion 16 and at the other end with a slot 23 (Figure IV) which cooperates with a pin 24 fastened on the left end plate 13 to limit the tilting motion of the indicia viewing device.

A shoulder 25 on the trunnion 16 (see Figure V) prevents axial movement of the indicia viewing device when the lock plate 21 is secured to the frame 7.

The reading line brackets 20 are each slotted at one end to receive the ends of the reading line 12, and are fastened to the end plates 13 with their slotted ends positioned on the axis of rotation of the trunnions 16 and 18.

A pair of shutters 26, which are rotatably journaled on the right trunnion 18, pivot as the lens frame 11 is moved to the right or left on the indicia viewing device, the shutters opening when the lens frame 11 is moved to the right and closing when it is moved to the left.

When the assembled indicia viewing device is to be installed in the scale, the reading line 12, strung between the reading line brackets 20, is guided through a slot 27 leading into the hole 19, and the trunnions are engaged in the holes 17 and 19 by a leftward axial movement. The reading line is thus supported along the axis of the trunnions 16 and 18 and adjacent the surface of the chart. When the viewing device is in place, the lock plate 21 journaled on the trunnion 16 is secured to the left chart support 7 by means of the screw 22. The indicia viewing device 8 with its reading line can thus be rapidly installed in or removed from the scale without disturbing any of its adjustments.

A variation of the invention is illustrated in Figure VII. This modification differs from the preferred embodiment in that the reading line is supported from the chart supports rather than from the indicia viewing device assembly.

In this embodiment reading line brackets 20a are fastened to upright chart supports 6a and 7a with their offset slotted portions projecting into openings that receive hollow trunnions 16a and 18a. A reading line 12a is positioned in the slots of the reading line brackets 20a and lies closely adjacent the surface of the chart.

The trunnions 16a and a lock plate 21a engaged behind a shoulder of the trunnion 16a are slotted lengthwise to receive the reading line 12a during installation or removal of the indicia viewing device.

Installation of the viewing device may be accomplished in this manner. First, the device is positioned with the end plates 13a offset forwardly and to the right of the cooperating chart supports 6a and 7a. The viewing device is then moved into position with the reading line 12a passing through the slot in the trunnion 16a. The indicia viewing device is then moved axially to the left until the trunnions are engaged in their respective holes. The lock plate 21a is secured to the chart support 7a and the scale is ready for operation.

In a further modification of the invention illustrated in Figure VIII, a pair of cylindrical bearing surfaces 28b which are laterally projecting machined portions of the chart supports 6b and 7b take the place of the trunnions in the previously described embodiments. A reading line 12b is positioned in the slots of reading line brackets 20b which are fastened to the chart supports 6b and 7b.

In this modification, the left end plate 13b and the lock plate 21b are slotted to accommodate passage of the reading line into recesses in said plates which coincide with the bearing surfaces 28b.

Axial movement of the indicia viewing device is prevented by a lock plate 21b fastened to chart support 7b, and a lock plate 29b fastened to right bearing surface 28b as illustrated in Figure VIII. The end plates 13b are held between said lock plates and chart supports 6b and 7b.

Various other modifications of the mounting may be made without departing from the scope of the invention.

Having described the invention, I claim:

1. In a weighing scale having an indicia bearing chart that is rotated by weighing mechanism, in combination, a first frame for supporting the chart, an indicia viewing device, a second frame for supporting the viewing device, a reading line supported by one of said frames, a pair of trunnions on one of the frames each extending in the same direction and adapted to engage in a hole in an adjacent part of the other frame, said trunnions being aligned with the reading line and being directed such that both are engaged or disengaged upon lateral movement of the second frame, that frame not supporting the reading line also having a slot that accommodates the reading line during installation or removal of the second frame, and means for preventing endwise movement of the second frame tending to disengage the trunnions and the holes.

2. In a weighing scale having an indicia bearing chart that is rotated by weighing mechanism and supports for the chart, in combination, an indicia viewing device, a frame for supporting the viewing device, a pair of coaxial hollow trunnions one in each end of the frame and each extending in the same direction, and a reading line carried by the frame which reading line extends from one to the other of the trunnions in line with the axes thereof, said chart supports having holes for receiving the trunnions, said holes being in alignment with the operative position of the reading line when cooperating with the chart, one of said supports having a slot leading into the hole in that support whereby the viewing device with the reading line in place may be installed or removed from the chart supports.

3. In a weighing scale having an indicia bearing chart that is rotated by weighing mechanism and supports for the chart, in combination, an indicia viewing device, a frame for supporting the viewing device, a pair of hollow trunnions mounted one in each end of the frame and projecting in the same direction from the frame along a common axis, and means on the frame for supporting a reading line along the axis of the trunnions, said chart supports having openings for receiving the trunnions, said openings being generally in alignment with the operative position of the reading line when cooperating with the chart, one of the supports having a slot leading into the opening in that support to accommodate the reading line as the frame of the viewing device is being installed on or removed from the supports.

4. In a weighing scale having an indicia bearing chart that is rotated by weighing mechanism and supports for the chart, in combination, a frame for an indicia viewing device, the frame having parallel end plates, hollow trunnions mounted from each plate and extending in the same direction along a common axis, brackets mounted on the plates and extending to the axes of the trunnions, a reading line supported by the brackets and extending along the axes of the trunnions, said supports having openings for receiving the trunnions, said openings being in alignment with the operative position of the reading line when cooperating with the chart, one of the supports also having a slot leading into the opening for receiving the reading line when the frame of the viewing device is being installed on or removed from the supports.

5. In a weighing scale having an indicia bearing chart that is rotated by a weighing mechanism and supports for the chart, in combination, an indicia viewing device, a frame for supporting the viewing device, said frame including a pair of end plates, aligned hollow trunnions mounted one on each of the end plates, one of the trunnions being directed away from the space between the end plates and the other into such space along a common axis, a reading line in alignment with the axes of the hollow trunnions, and brackets for supporting the reading line, the brackets being mounted on the sides of the end plates away from the trunnions and extending to the axes of the trunnions, said chart supports having holes in alignment with the operative position of the reading line to receive the trunnions of said frame, that one of the supports cooperating with the inwardly directed trunnion having a slot leading into the hole whereby the slot provides passage space for the reading line as the frame is installed or removed.

6. In a weighing scale, in combination, an indicia bearing chart that is rotated by a weighing mechanism, supports for the chart, an indicia viewing device, a frame for supporting the viewing device, said frame including a pair of end plates, aligned hollow trunnions mounted one on each of the end plates, one of the trunnions being directed away from the space between the end plates and the other into such space along a common axis, said chart supports having holes to receive the trunnions, a reading line mounted on the chart supports in alignment with the holes, and a member that is journaled on one of the trunnions and that is attachable to one of the chart supports for holding the frame against axial displacement, said trunnion which is directed away from the space between the end plates, the end plate mounting that trunnion, and all other parts surrounding the trunnion being slotted to accommodate the reading line during installation or removal of the frame.

7. In a weighing scale having a rotatable cylindrical chart cooperating with a reading line and a lens system for viewing the chart and reading line, in combination, a first frame for supporting the rotatable chart, a second frame for the lens system, one of said frames also supporting the reading line, and means at each end of the reading line for mounting the second frame on the first, said means at each end comprising a trunnion on one of the frames adapted to engage in a hole in an adjacent part of the other frame, said trunnions being aligned with the reading line and directed such that both are engaged or disengaged upon lateral movement of the second frame, that frame not supporting the reading line also having a slot that accommodates the reading line during installation or removal of the second frame.

NORMAN E. HART.

References Cited in the file of this patent

UNITED STATES PATENTS

| Number | Name | Date |
|---|---|---|
| 1,669,428 | Strachan | May 15, 1928 |
| 2,030,013 | Marshall | Feb. 4, 1936 |
| 2,088,257 | Beisser | July 27, 1937 |
| 2,172,802 | Marshall | Sept. 12, 1939 |